(12) United States Patent
McWhorter

(10) Patent No.: US 8,168,335 B2
(45) Date of Patent: May 1, 2012

(54) ELECTROLYTIC DIFFUSION FUEL CELL

(76) Inventor: Edward Milton McWhorter, Citrus Heights, CA (US)

( * ) Notice: Subject to any disclaimer, the term of this patent is extended or adjusted under 35 U.S.C. 154(b) by 423 days.

(21) Appl. No.: 12/590,814

(22) Filed: Nov. 16, 2009

(65) Prior Publication Data

US 2011/0117450 A1 May 19, 2011

(51) Int. Cl.
*H01M 8/00* (2006.01)
*H01M 8/06* (2006.01)
*H01M 4/02* (2006.01)
*H01M 4/36* (2006.01)

(52) U.S. Cl. ......... 429/400; 429/532; 429/523; 429/408

(58) Field of Classification Search .......... 429/400, 429/532, 523, 408
See application file for complete search history.

(56) References Cited

U.S. PATENT DOCUMENTS 6,653,007 B2 * 11/2003 McWhorter .......... 429/416

* cited by examiner

*Primary Examiner* — Helen O Conley

(57) ABSTRACT

The invention is a new and improved method of generating an electric current in an Electrolytic Fuel Cell. An electric current is produced by the rupture of hydrogen bonds to oxygen atoms of water molecules by hydrolyzation of alkaline metals from the surface of a tape passing through a turbulent moving stream of a diffuse mixture of air and water. The electrons produced by the chemical reaction of dissociation are subsequently attracted to the finned surfaces of an ionic capacitor which is connected in series with an electrolytic capacitor which delivers the current to the load.

3 Claims, 5 Drawing Sheets

ELECTROLYTIC DIFFUSION FUEL CELL

CROSS REFERENCE

Ref. 1 U.S. Pat. No. 6,653,007 Hydrogen Generator
Ref. 2 U.S. Pat. No. 6,831,825 Fuel Cell Ionic Capacitor
Ref. 3 U.S. Pat. No. 7,288,335 Alkaline Electrode Tape
Ref. 4 U.S. patent application Ser. No. 12/055,093 filed Dec. 26, 2007 Potassium Electric Generator and Chemical Synthesizer
Ref. 5 U.S. Pat. No. 7,381,378 Coal Flue Gas Scrubber
Ref. 6 U.S. patent application Ser. No. 12/286,888 filed Oct. 3, 2008 Polar Ordinate Chamber

BACKGROUND OF THE INVENTION

Free electrons are generated by the reaction of an alkaline metal, or alkaline earth metal, with water molecules during hydrolyzation. In previous electrolytic fuel cell designs as described in Ref. 1 and Ref. 4 the hydrolyzation of alkaline metals is carried out in the liquid state of the cell aqueous electrolyte. In the invention presented the hydrolyzation of the alkaline metal fuel is hydrolyzed in a turbulent air and water diffusion mist that is sprayed into a hydrolyzation chamber. The turbulent spray of air and water is hereinafter called a "diffusion stream" and the electrolytic fuel cell that employs this type of hydroxylation is termed an "electrolytic diffusion fuel cell".

The turbulent flow of the air and water of the said diffusion stream is directed toward an exposed alkaline metal that has been placed on the surface of the fuel carrier tape of an alkaline electrode tape described in Ref. 3. In the design of electrolytic fuel tapes the alkaline metal carrier tape is the negative pole, or cathode pole of the cell.

During the operation of the fuel cell of the present invention the turbulent flow of the air and water of the said diffusion stream is directed toward an exposed alkaline metal that has been placed on the surface of a carrier tape of an alkaline electrode described in Ref. 3. The alkaline metal electrode is passed in front of the diffusion stream in a hydrolyzation chamber and the exposed alkaline metal hydrolyzed in a chemical reaction which ruptures the hydrogen bonds to the oxygen atom of the water molecules of the diffusion stream releasing electrons ($e^-$) and protons ($H^+$) into the gaseous stream of the diffusion stream. The released electrons are carried by electrical conduction in the gaseous stream into the inlet of an ionic capacitor described in Ref. 2. The electrons in the said gaseous stream possess a negative charge and are therefore by difference of static electrical potential attracted to the positively charged finned surfaces of an ionic capacitor. The electrons captured on the finned surfaces of the said ionic capacitor pass through an electrical conductor and are transferred to an electrolytic capacitor and are subsequently transferred to a load circuit which in the present design is a battery charging circuit for mobile charging.

Electricity is stored in an alkaline metal by the process of electrolysis. The amount of electricity stored in alkaline metals is termed its electrochemical equivalence when the metal is reduced to its purest elemental state. By the First Law of Thermodynamics the relative processes of electrolysis and hydrolysis are completely reversible processes. The amount of electricity released from a reduced alkaline metal during hydrolysis is equal to its electrochemical equivalence. To date only sodium produced from sodium chloride (NaCl) has attained a strong commercial importance as a reducing agent. In commercial production of sodium it is most generally produced from sodium chloride (NaCl) in a Downs cell. Sodium Chloride (NaCl) is cheaper as a raw material than sodium hydroxide (NaOH) feed stock produced in a Castner cell. Sodium Chloride (NaCl) has a melting point of. 1,481° F. as compared to 604° F. for NaOH. Because of the high melting point of NaCl it is expected that initial pool supply will be produced from Downs cell operation and recycled sodium will be produced from sodium hydroxide by the Castner cell process.

The Electrolytic Diffusion Fuel Cell is initially proposed as a mobile source for recharging batteries in an electrical powered vehicle while the vehicle is in motion. Vehicle battery capacity is specified as its fully charged capacity given in amp-hrs such that it is readily compared in terms of specific power in delivered torque and in specific energy for vehicle range, with the electrochemical equivalence of electrolysis of alkaline metals. The electrochemical storage capacity of the reactive alkaline metals and metal complexes proposed in the present invention are given in amp-hrs per pound in the table below.

| ELECTROCHEMICAL STORAGE CAPACITY | |
|---|---|
| Active metal system | Amp-hrs/lb |
| Sodium (Na) | 528.71 |
| NaCa nodular | 567.73 |
| NaCaMg comples | 711.79 |
| Lithium | 1,751.99 |
| Calcium | 606.74 |
| Potassium | 311.00 |
| Magnesium | 999.90 |

The major problem experienced in the design of electrolytic fuel cells is the method of delivery of very small discrete quantities of alkaline metal fuels for hydrolyzation in the cell cathode reaction chamber. At higher delivery rates the kinetic and exothermic reaction of Group I metal fuels, Na and k, require blending with Group II metals, Ca and Mg to moderate the highly kinetic and exothermic reactions.

Two additional problems encountered in the design of electrolytic fuel cell systems is the static loss of stray electrons to surrounding cell conducting surfaces, and the disposal of spent electrolyte. The said static losses can be reduced by designing the contiguous surfaces near the hydration reaction zone from non-conducting insulative material in close contact with the metal strakes of the capacitor tuyere of Ref. 4 and by installing a conducting positively charged grid at the hydration reaction zone inlet to prevent upstream gaseous conduction. Spent electrolyte is used directly in coal scrubber systems of Ref. 5 to strengthen the hydrogen bond (H—H) between water spray molecules for increased retention strength of the capture medium. The gaseous component exiting the capacitor tuyere of Ref. 4 is rich in protons ($H^+$) which may be passed through a polar ordinate chamber of Ref. 6 to increase the molecular weight of the water vapor component making moderating confinement of low reactive fuel rods accessible and more attractive cost-wise which will greatly alleviate the disposal process of enriched uranium spent rods from nuclear generating plants.

Excessive mechanical design of the (EDFC) Electrolytic Diffusion Fuel Cell is presented to demonstrate working practicality and logical means and does not constitute novelty. This excess mechanism is necessary to describe the logical manner of hydration of alkaline metals and alkaline earth metals in a diffusion of an air and water stream which constitutes the novelty of the invention.

SUMMARY OF THE INVENTION

An electrolytic diffusion fuel cell (EDFC) is presented as an assembly of previously patented matter. The novelty of the invention is not in the assembly itself, but instead, the novelty to be claimed by the system presented is in the manner in which the water component of an air/water diffusion stream is brought into contact with the reacting alkaline metal for hydrolyzation. The novelty of the diffusion fuel cell is the processing environment of hydrolyzation that extends beyond the novelty of Cross Ref. 1 in which hydrolyzation occurs in a liquid electrolyte.

It is an object of the invention to produce electricity by chemically reacting alkaline metals in an air/water diffusion stream to produce electrons and absorb them in an ionic capacitor circuit.

It is yet another object of the invention to produce a gaseous by-product of the said diffusion stream ionic spent electrolyte rich in gaseous protonic hydrogen for further downstream processing to increase the weight of water molecules.

And still it is another object of the invention to produce spent moderating calcium electrolyte for the synthesis of calcium cyanamide from coal fired furnace flue gases.

It is another object of the invention to use spent electrolyte solution to increase the hydrogen (H—H) bond of flue gas scrubber water to increase the strength of capture grid of $CO_2$ used in the production of di-carboxylic acids as base reagent for organic synthesis of higher carbon chains.

BRIEF DESCRIPTION OF THE DRAWINGS

Drawings of an interconnecting assembly comprising new and useful improvements of an electrolytic fuel cell which employs the novel process of air and water diffusion for the hydrolyzation of alkaline metals are presented.

FIG. 4a is a side view of the air/water diffusion system in cross-section.

FIG. 4b is a top plan view of the air/water diffusion system of FIG. 4a.

DETAILED DESCRIPTION OF THE INVENTION

Figure 1A:
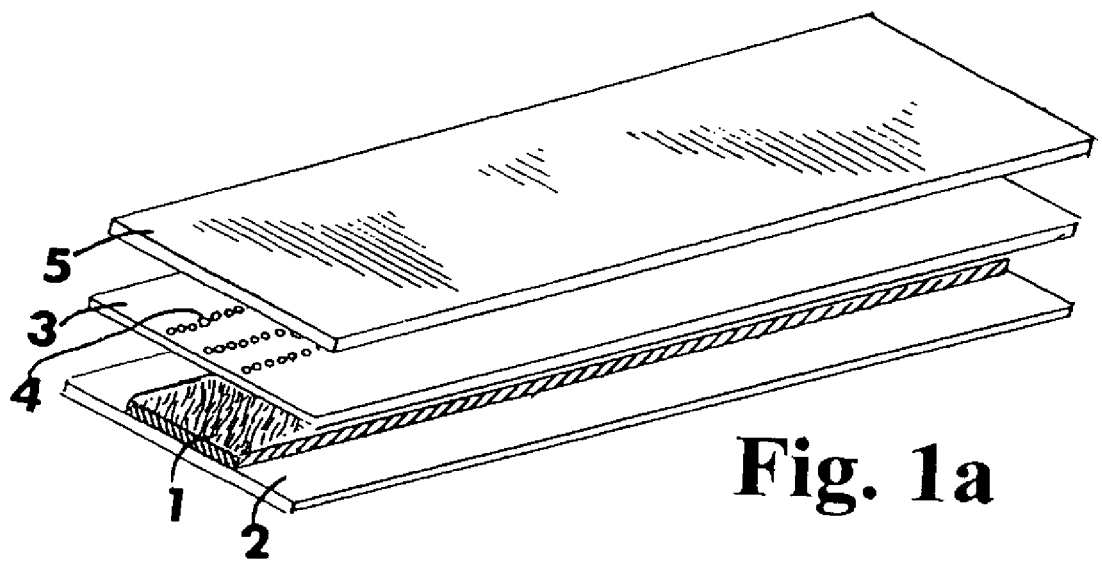
FIG. 1a is a drawing of the four components forming the composite alkaline tape of the cell cathode electrode.

FIG. 1a illustrates the positional order of the four structural components comprising a cathode alkaline electrode tape as described in Ref. 3. Alkaline metal fuel 1 is deposited on carrier insulation tape 2. Directly above carrier insulation tape 2 is positioned perforated tape 3 which has a plurality of rows of small perforations 4 running along its full length. Positioned above the perforated tape 3 is stripper tape 5.

Figure 1B:
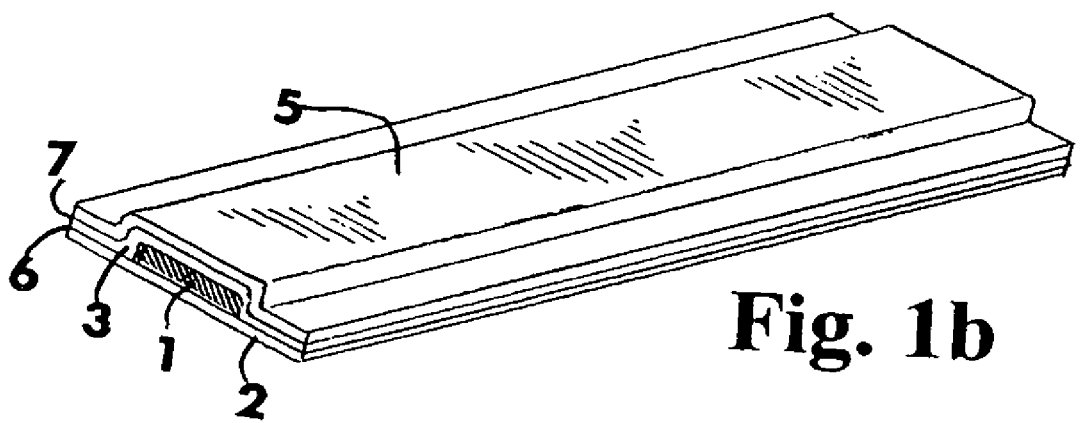
FIG. 1b shown in cross-section shows the method of hermetic sealing the four structural components of FIG. 1a into a single tape structure.

FIG. 1b is a cross-section of the assembled four structural elements, alkaline metal 1, carrier insulation tape 2, perforated tape 3, and stripper tape 5 brought together as a single composite tape. Carrier tape 1 edges are fused to both edges of perforated tape 3 at fusion point 6 such that they cannot be separated. Stripper tape 5 edges are adhered to both top edge surfaces of perforated tape 3 with an elastic adhesive at adhesive point 7 hermetically sealing alkaline metal fuel within the composite assembly. All of the said tapes have aluminized or metalized surface such that electrical continuity is uniform throughout the electrode.

Figure 2:
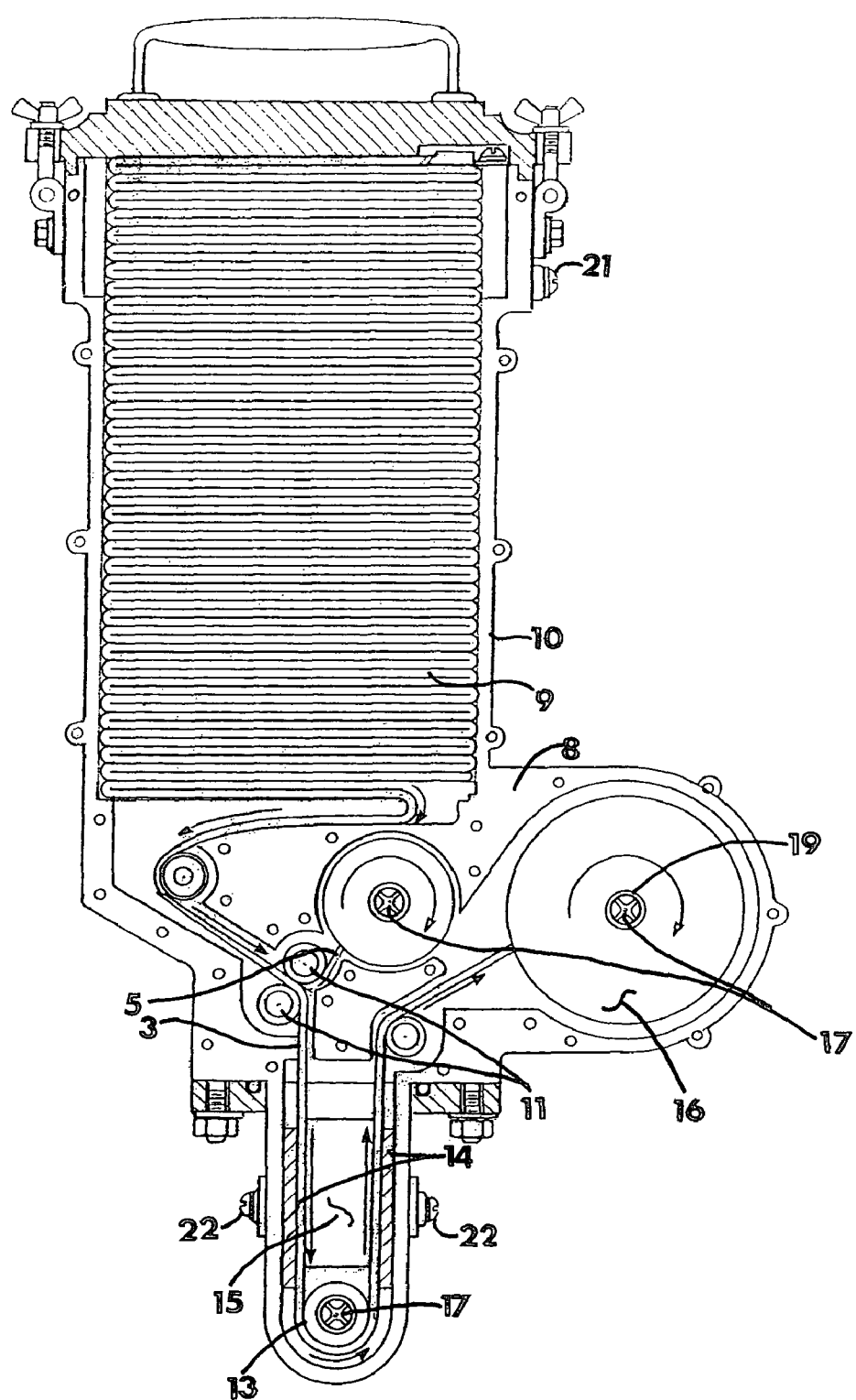
FIG. 2 illustrates the method of packaging the cathode electrode of FIG. 1b into an accordion fold magazine which has been inserted into a dispensing spool mechanism.

Referring now to FIG. 2. The cell is energized by pulling stripper tape 5 at right angles to perforated tape 3 at the contacting juncture of paired rollers 11 causing the rupture of adhesive bonding point 7 in tension. Removal of the stripper tape 5 exposes metal 1 to diffuse mixtures of air and water diffusion mist which is now contiguous to and in contact to said metal fuel 1 through perforations 4 while passing under bottom roller 13 when magazine cartridge case 10 is inserted into spool dispensing mechanism 8. Expended stripper tape 5 are rolled on stripper tape dispensing spool 12 and expended perforated tape 3 and carrier insulation tape 2 is rolled on carrier dispensing spool 16. During exposure of metal fuel 1 in front diffusion rectangular opening 15 the back metalized surfaces of carrier tape 2 are in rubbing contact with two continuity plates 14 carrying the returning load current from upper terminal 21 to continuity plates 14 terminals 22. The ends of splined shafts 17 which turn stripper tape dispensing spool 12, carrier dispensing spool 16 and bottom roller 13 are shown as being extended into each of the said roller and spool axial mating splined housings. Carrier dispensing spool 16 is equipped with a spring loaded slip clutch 19 to compensate for variations in rotational velocity which occurs as a resulting difference in tape thickness between expended stripper tape 5 and the combined fused thickness of perforated tape 3 and carrier insulation tape 2 which will effect a difference in the radial velocity of each of the expended tape diameters when rolled on each of the said dispensing spools.

Figure 3A:
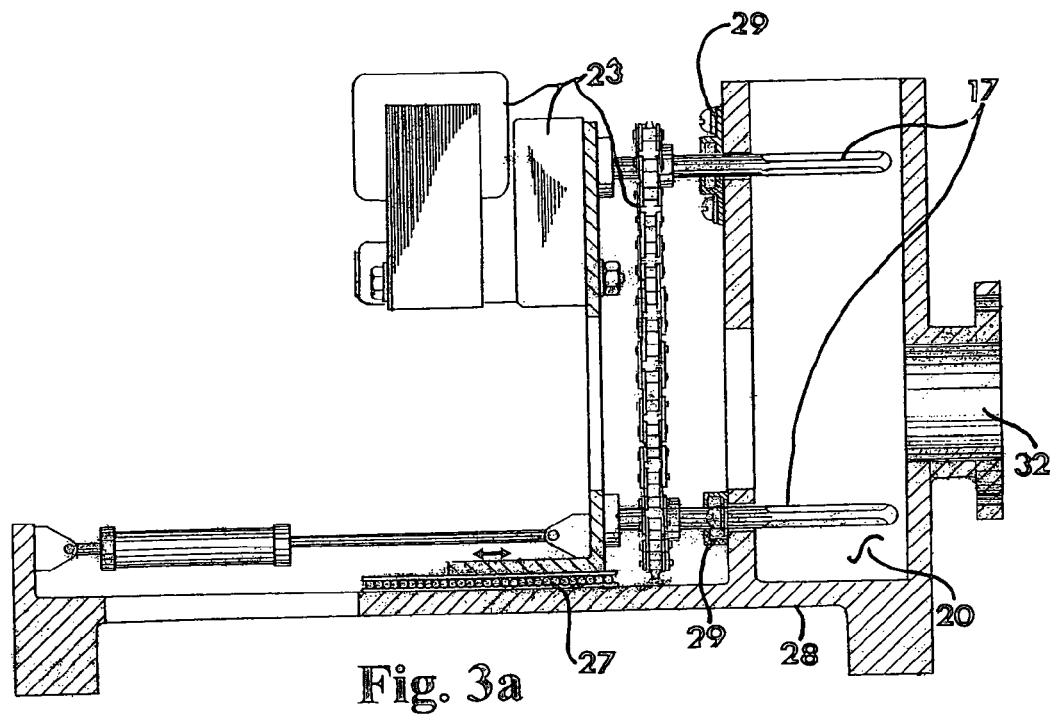
FIG. 3a is a drawing of the horizontal extracting mechanism used to extract the splined drive axels of the spool drive mechanism.
Figure 3B:
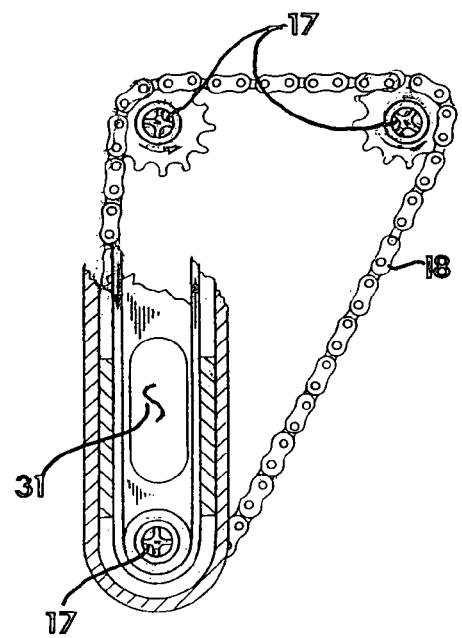
FIG. 3b is a frontal view of the chain link arrangement of the horizontal extraction mechanism.

Turning now to FIG. 3a and FIG. 3b which illustrates the motor driven roller chain assembled mechanism 23 which coordinates the rotation of the three splined shafts 17 of the spool dispensing mechanism 8 previously shown in FIG. 2 and provides a means of extracting the three splined shafts 17 from hydrolyzation chamber 20. The said motor driven chain mechanism 23 comprising an electric motor 24 and reduction gear box 25 mounted on a drive frame 26 shown in cross section. Said drive frame 26 is slidably mounted on a linear bearing rack 27. Said linear bearing rack 27 fixedly mounted on cell frame 28 shown in cross-hatched section also holding the hydrolyzation chamber 20 shown in cross-hatch section showing the spline shafts 17 inserted through seals 29 into said hydrolyzation chamber 20. Spline shafts 17 are retracted from hydrolyzation chamber 20 when drive frame 26 is pulled back by hydraulic or pneumatic actuation cylinder 30 to its retracted position. The inlet passage 31 to hydrolyzation chamber 20 is a narrow rectangle with rounded ends as shown in FIG. 3b. The outlet passage from hydrolyzation chamber 20 is a flanged circular opening 32 shown in FIG. 3a.

Figures 4A, 4B:
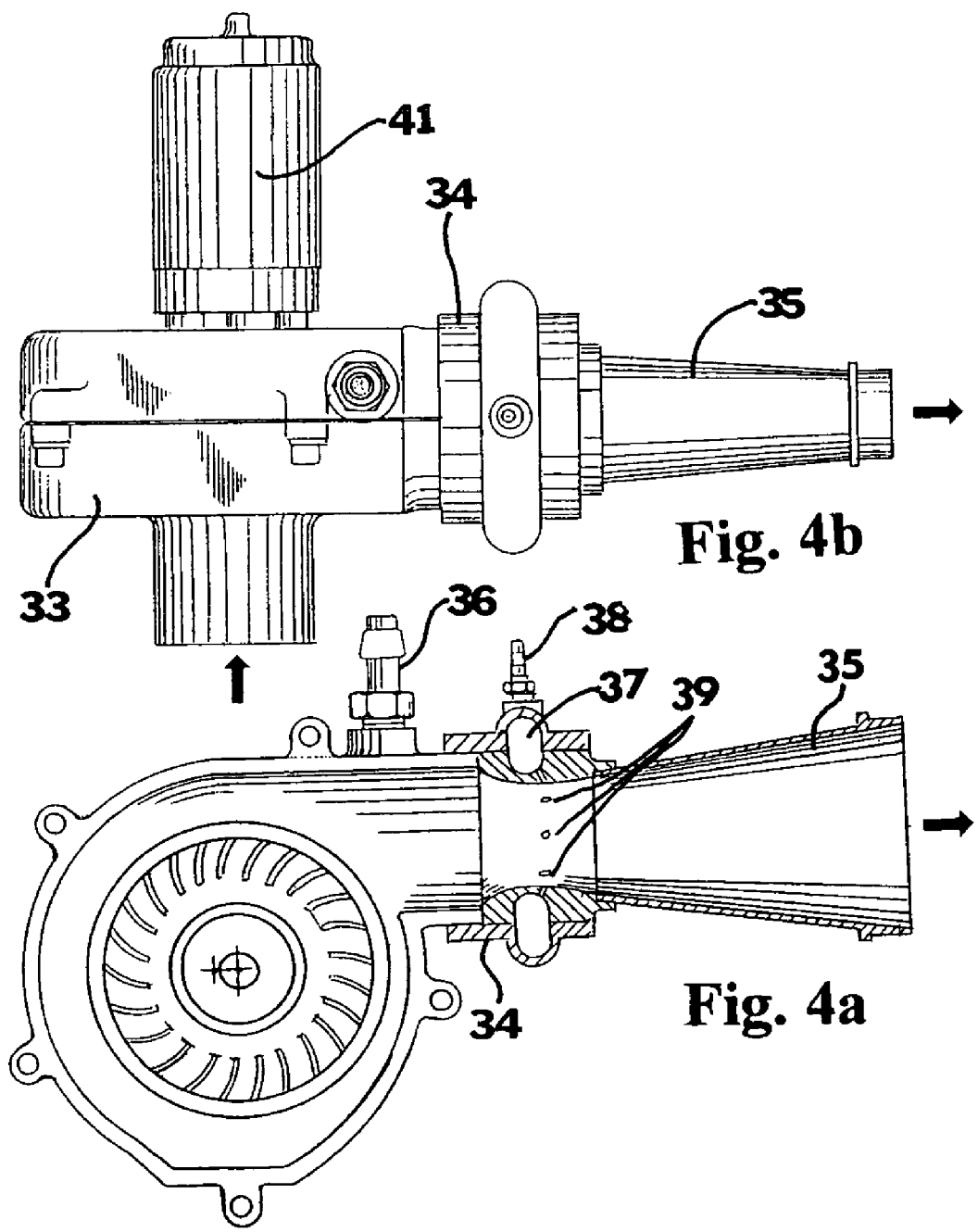

Referring now to FIGS. 4a and 4b showing the component elements of the three major assemblies comprising the air/water diffusion stream system used in the hydration process of metal fuel 1 through perforations 4 of perforated tape 3 passing in front of inlet 31 of FIG. 3b into square diffusion opening 15 of hydrolyzation chamber 20 shown in FIG. 2. The three major assemblies comprising the air/water diffusion stream system shown in FIGS. 4a and 4b are centrifugal air blower 33 driven by motor 41, venture water aspirator 34 circuit, and nozzle extension 35. Mounted on top of the said centrifugal fan air blower 33 is hose fitting 38 used for bleeding a small portion of air pressure into spool dispensing mechanism 8 cavity of FIG. 2 to retard upward moisture encroachment from hydrolyzation chamber 20. Venturi water aspirator 34 is comprised of venturi throat section with a water manifold 37 and an inlet water fitting 38 to said water manifold. Water is aspirated into air stream of centrifugal fan air blower 33 through venturi orifices 39. Down stream of venturi orifices 39 is nozzle extension 35. At its attaching point to said venturi said nozzle extension 35 is circular but at its exit it is rectangular with rounded surfaces such that it interfaces and fits exactly into inlet 31 of hydrolyzation chamber 20 shown in FIG. 3b. The pressure ratio of inlet to outlet across the venturi throat should be as near 1.8 as possible this requirement is a design factor limiting the amount of air that can be passed through air hose fitting 38. The inlet to outlet expansion ratio of nozzle extension 35 is about 2, providing additional diffusion stream velocity.

Figure 5:
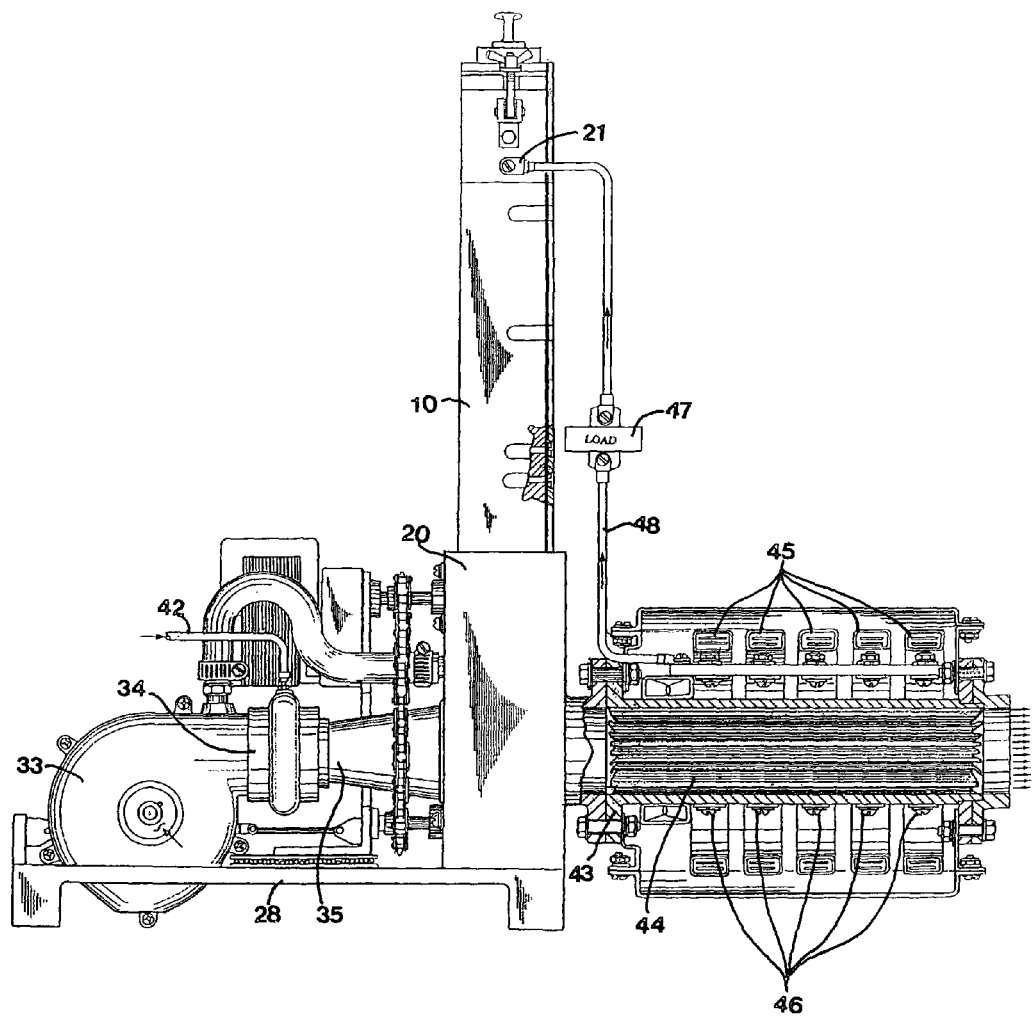
FIG. 5 is a side view of the total diffusion cell circuit showing the capacitor tuyere of Ref. 4 in cross-section.

Turning now to FIG. 5 which is the assembly drawing of the Electrolytic Diffusion Fuel Cell. To avoid double patenting only the singular novel feature pertinent is presented as the manner of hydrolyzation of the alkaline metal fuel of alkaline tape 9 by the air/water diffusion stream generated by the mechanism present in FIGS. 4a and 4b and is considered a new and improved method of electrolytic fuel cell operation.

Shown in FIG. 5, cartridge case 10 encasing alkaline fuel tape 9 is inserted into hydrolyzation chamber 20. The diffusion blower circuit comprising centrifugal fan air blower 33, venturi water aspirator 34 and nozzle extension 35 are shown mounted on cell frame 28 with the said nozzle extension 35 exit in communication with hydrolyzation chamber inlet 31. Water line inlet 42 delivers water to venturi water manifold 37. Hydrolyzation of a sodium (Na) fuel (Na+$H_2O \rightarrow H^+ + e^- +$ NaOH) produces electrons ($e^-$) which are carried into the interior of capacitor tuyere 43 and deposited on capacitor tuyere strake fins. Said capacitor strakes placed in communication with toroidal electrolytic capacitors 45 by screws 46. Capacitor flow from said toroidal capacitors 45 is carried to load 47 through load line 48 and returns to upper continuity terminal 21 completing the cell electric circuit.

| Numbered Elements | | | |
|---|---|---|---|
| 1. | Metal fuel | 25. | Reduction gear box |
| 2. | Carrier insulation tape | 26. | Drive frame |
| 3. | Perforated tape | 27. | Linear bearing rack |
| 4. | Perforations | 28. | Cell frame |
| 5. | Stripper tape | 29. | Seals |
| 6. | Fusion point | 30. | Actuation cylinder |
| 7. | Adhesive point | 31. | Inlet |
| 8. | Spool dispensing mechanism | 32. | Outlet |
| 9. | Alkaline fuel tape | 33. | Centrifugal fan air blower |
| 10. | Magazine cartridge case | 34. | Venturi water aspirator |
| 11. | Paired separating rollers | 35. | Nozzle extension |
| 12. | Stripper tape dispensing spool | 36. | Hose fitting |
| 13. | Bottom roller | 37. | Water manifold |
| 14. | Continuity plates | 38. | Water hose fitting |
| 15. | Diffusion opening | 39. | Venturi orifices |
| 16. | Carrier dispensing spool | 40. | |
| 17. | Splined shafts | 41. | Motor |
| 18. | | 42. | Water line inlet |
| 19. | Spool slip clutch | 43. | Capacitor tuyere |
| 20. | Hydrolyzation chamber | 44. | Strakes |
| 21. | Upper continuity terminal | 45. | Toroidal capacitor |
| 22. | Continuity plate terminals | 46. | Screws |
| 23. | Motor chain mechanism | 47. | Load |
| 24. | Motor | 48. | Load line |

What is claimed is:

1. A method of generating an electric current from electrons produced by the rupture of hydrogen bonds to oxygen atoms of water molecules during the hydrolyzation of alkaline metals from the surface of a tape passing through a turbulent moving stream of a diffuse mixture of air and water.

2. Claim 1 in which the said electrons are statically attracted to the finned surface of an ionic capacitor.

3. Claim 1 in which the said electrons are statically attracted to the finned surfaces of an ionic capacitor which is connected in series with an electrolytic capacitor.

* * * * *